Figure 1:
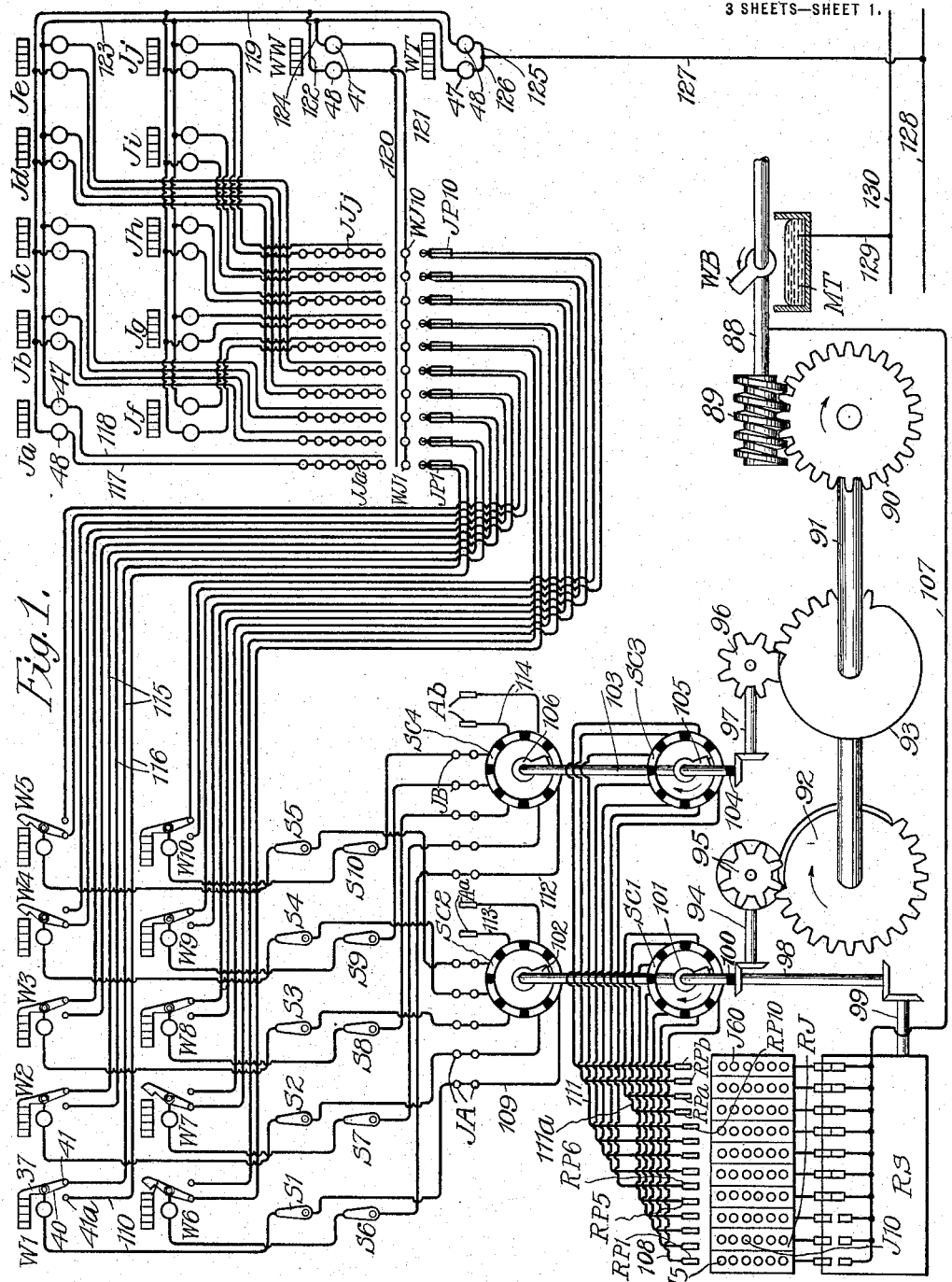

F. O. HEUSER.
ACCOUNTING SYSTEM.
APPLICATION FILED JAN. 3, 1910. RENEWED JUNE 18, 1915.

1,169,078.

Patented Jan. 18, 1916.

3 SHEETS—SHEET 2.

Witnesses

Inventor
Frederick O. Heuser
BY
Attorneys

F. O. HEUSER.
ACCOUNTING SYSTEM.
APPLICATION FILED JAN. 3, 1910. RENEWED JUNE 18, 1915.
1,169,078.
Patented Jan. 18, 1916.
3 SHEETS—SHEET 3.
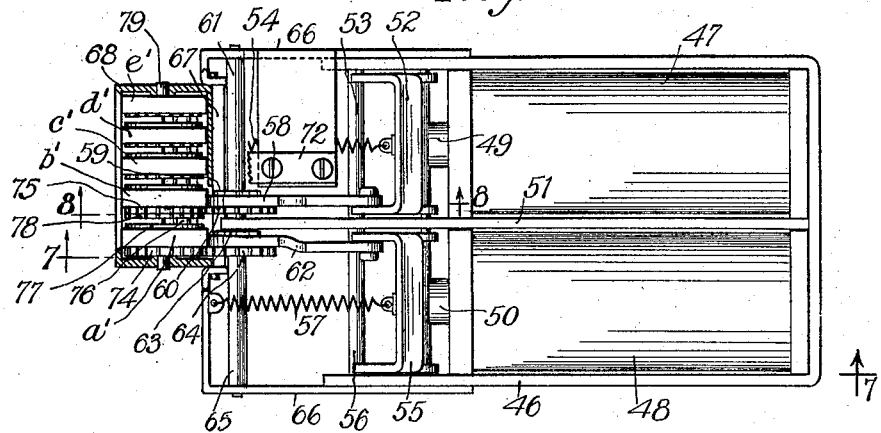
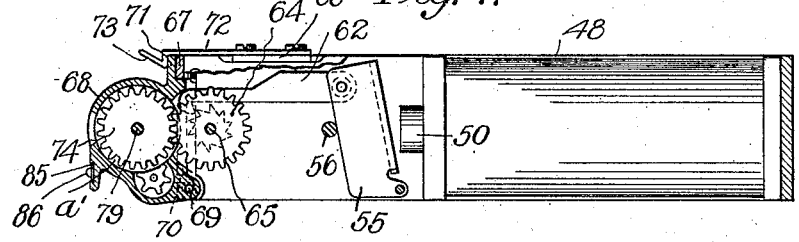
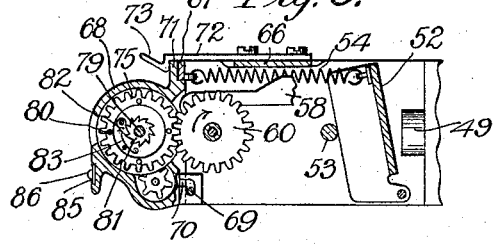
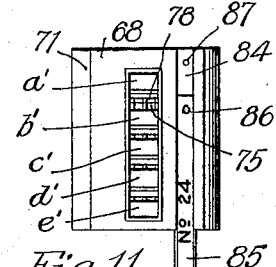
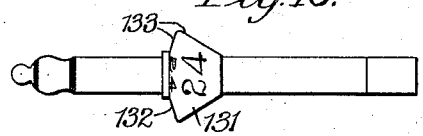
Witnesses:
Inventor
Frederick O. Heuser
By
Attorneys

UNITED STATES PATENT OFFICE.

FREDERICK O. HEUSER, OF CHICAGO, ILLINOIS, ASSIGNOR, BY MESNE ASSIGNMENTS, TO WILLIAM R. HEATH, OF BUFFALO, NEW YORK.

ACCOUNTING SYSTEM.

1,169,078.  Specification of Letters Patent.  Patented Jan. 18, 1916.

Application filed January 3, 1910, Serial No. 536,120. Renewed June 18, 1915. Serial No. 34,957.

*To all whom it may concern:*

Be it known that I, FREDERICK O. HEUSER, a citizen of the United States, residing at Chicago, in the county of Cook and State of Illinois, have invented a certain new and useful Improvement in Accounting Systems, of which the following is a full, clear, concise, and exact description, reference being had to the accompanying drawings, forming a part of this specification.

My invention relates to improvements in accounting systems, and has particular reference to an electrically operated system for wage accounting and distribution of wages to a plurality of jobs.

In my copending application, Serial No. 495,717, filed May 13, 1909, I have described an accounting system in which the various wage registers are serially actuated by electromagnetic means. These actuations are totalized in a total wage register, and by means of suitable connections job registers are included in the same circuits with the wage registers, and the producing wages are thereby distributed to a plurality of jobs, and the non-producing wages are totalized in a waste-wage register. Suitable provision is made so that the number of electrical impulses traveling to the actuating mechanism of any wage register is made to depend directly on the rate of wages which is assigned to the individual workman.

The general system employed in the present invention is much the same as that in my copending application Serial No. 495,717, which has been briefly summarized in the above description.

It will be clear that when the rate of wages assigned to an individual workman is high, it will be necessary to actuate the register a greater number of times in order to cause it to indicate the proper amount of wages. For example, if a workman receives sixty cents per hour, under ordinary circumstances it will be necessary to impart ten times as many actuations to his register as would be the case if he received but six cents an hour.

By the provisions of my present invention, the number of actuations in the two cases would be the same, this result being accomplished by providing a shutter which normally covers a dummy units numeral wheel, thus causing the tens numeral wheel to become the units wheel. Thus, if in its normal or covered condition, the register read "6," when the shutter is removed the reading will be "60," although the number of actuations of the register has of course in the two cases been exactly the same. By this simple mechanism it is possible to give a wide range to the readings of the register without making it necessary to actuate the register ten times as often when the reading is ten times as much.

Inasmuch as the actual reading of the register is ten times as much when the shutter is withdrawn as when the units wheel is covered, it follows that since the same number of impulses flows to the totalizing register in each case, the indications of the latter register would be incorrect unless some mechanism were provided by means of which the total register is actuated at a different rate according to the position in which the shutter on each register is placed.

In order to accomplish the desired result I provide two electromagnetic actuating mechanisms in connection with each register, these mechanisms serving to actuate gears, one of which is in mesh with the tens numeral wheel of the totalizing register, and the other in mesh with the units numeral wheel. When the shutter of the wage register is in its normal position, whereby the dummy units wheel is covered, the connection is made to the electromagnetic actuating mechanism of the totalizing register, so that the units wheel is actuated. On the other hand, when the shutter is moved to the position in which the dummy numeral wheel is exposed, thereby causing the actual readings to be ten times the number of actuations, the connection is made with the electromagnetic actuating mechanism of the totalizing register which actuates the tens numeral wheel. As described hereafter, suitable mechanism is provided on the totalizing register, so that the units and tens numeral wheels may be independently actuated.

According to the system which I have formerly employed, and which is described in my copending application above mentioned, it has been the practice to provide a selector mechanism consisting of a number of conducting and non-conducting segments, a single conducting segment being connected with the circuit assigned to each individual workman. A rate switch has also been employed, which allows the circuit to be closed for a length of time proportional to the rate of wages assigned to the workman. For example, if a workman were to receive sixty cents an hour and the brush of the selector mechanism made contact with his particular segment sixty times in an hour, it is clear that provided one impulse corresponded to one cent of wages, the rate switch should be connected all of the time. On the other hand, if he received wages amounting to ten cents per hour the rate control would allow the circuit to be closed only once each six revolutions of the selector brush. It is thus evident that a large number of contacts which are made by the brush of the selector mechanism serve no useful purpose. In order to overcome this disadvantage I provide two or more selector mechanisms, the rotating brushes of which are actuated at different velocities. For example, if we had two selector mechanisms they might well be operated so that the brush of one rotated at a velocity twice that of the other, and instead of having a single selector mechanism where sixty contacts an hour were made on each individual segment, the first selector mechanism could have the contacts made at the above-mentioned rate, and the second at the rate of thirty contacts per hour. In this way only two out of three contacts will be unused as a means for closing the circuit associated with the wage register and therefore actuating the same, whereas in the former case five out of six of such contacts were unused. In place of two selector mechanisms I could employ as many as were desirable, these various mechanisms operating at a plurality of velocities, so that all workmen receiving wages from ten to twenty cents per hour could have their circuits associated with one selector mechanism, all workmen receiving from twenty to thirty cents with another, and so on.

It sometimes happens that it is desirable to increase the number of actuations to a greater extent than is provided for by the rate switch. In the case which we assumed above, the maximum rate of wages which a a man could receive was sixty cents per hour, inasmuch as the rate switch was closed continuously for this rate. The rate could be doubled, however, by means of causing a single wage-controlling circuit to be closed, not only when the brush of the selector mechanism comes in contact with a single segment, but also when it comes in contact with another segment which is connected with a sixty cent rate jack of the rate switch or rate control. This result may conveniently be accomplished by providing a plug and conductor, the latter of which is connected to the segment which it is desired to include in the circuit. The circuit is closed by inserting selected plugs in jacks which are associated with the particular circuit through which it is desired to increase the number of impulses. In this way the number of actuations through a given circuit may be increased as desired. For example, if sixty impulses normally pass through the circuit which controls a given wage register, if it is desired to pay a man seventy cents per hour, the plug which is associated with a segment electrically connected with a jack of the rate switch which allows ten impulses to pass to the segment is inserted in a jack associated with the circuit controlling the wage register. The use of these so-called "addition plugs" affords a ready means for increasing a workman's wages as desired, inasmuch as the auxiliary segment which is to be electrically connected with the wage-controlling circuit may be electrically connected with a jack of the rate switch which will allow any desired number of additional impulses to pass through the wage circuit. Not only may one auxiliary segment be thus included in the wage circuit, but any additional number may be similarly included, thus increasing the number of impulses indefinitely.

According to the system described in my copending application above mentioned, it is necessary for a clerk to take the readings of the various registers at the end of each pay period, and then to reset the registers to zero for further actuation during the next pay period. In my present invention I provide detachable registers or counters. At the end of each pay period, for example each week, a clerk may remove the registers and replace each register by one which has already been set back to zero. The register which has been removed may be retained for several days before resetting, so that in case of any dispute with workmen, reference may be made to the register in which the original actuations are recorded. As will be described hereafter, the register may be removed, with its carry-over wheels, or the carry-over wheels may be permanently mounted in the frame of the accounting machine and only that part of the register which comprises its casing and numeral wheels and the associated parts may be removed. In connection with the job registers it is often preferable to remove the carry-over wheels with the register, and the register may then be decumulated, its indication being transferred to a totalizing register, as described in the copending application of W. J. Crumpton, Serial No. 495,417, filed May 12, 1909, and his copending application Serial No. 446,895, filed August 4, 1908.

According to this system by which removable registers are used, the wear on the actuating mechanism for the registers is greatly reduced, in that it is unnecessary to decumulate the registers by means of the same mechanism with which they are originally actuated.

In order to make sure that a register is placed in its proper blank position in the machine, pins are provided on each register which fit into corresponding holes or sockets in the machine. For example, let us suppose that there are two rows of possible positions in which the pins may be placed in order to fit into appropriate holes in the machine. If we use one pin in each row in which there are ten possible positions it is evident that a hundred different combinations of positions in which the pins may be placed can be obtained. That is, if a hundred workmen are employed, each workman can have his registers made with the pins in a different position from those on every other register. Similarly, if three rows of possible positions are used, and one pin is placed in each row, a thousand different combinations may be obtained. As will be explained hereafter, each register is provided with a number corresponding to the number of the individual workman, or the job, and the use of pins acts as a check to absolutely prevent the register from being placed in the space allotted to a workman to whom the particular register is not assigned.

These and other advantages of my invention will be more apparent by reference to the accompanying drawings, in which—

Figure 2:
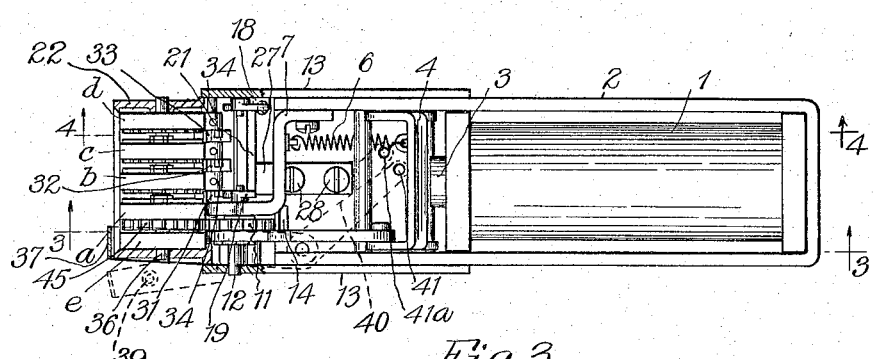
Figure 3:
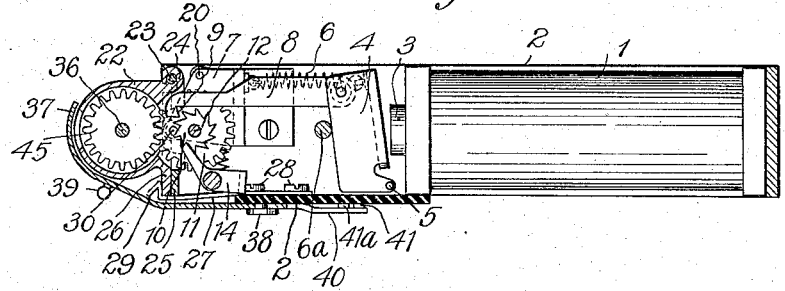
Figure 4:
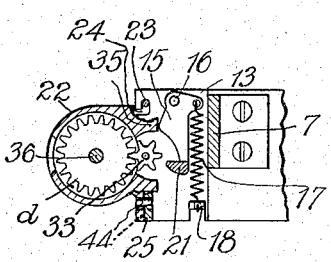
Figure 5:
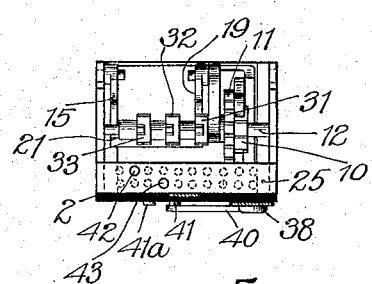

Figure 1 is a diagrammatic view representing my improved system as a whole. Fig. 2 is a plan and partly sectional view of a register and its associated actuating mechanism, the register being provided with a movable shutter. Fig. 3 is a sectional view on the line 3—3 of Fig. 2. Fig. 4 is a fragmentary sectional view on the line 4—4 of Fig. 2. Fig. 5 is a front elevation of the parts shown in Fig. 2, the register being removed. Fig. 6 is a plan and partly sectional view of a job register showing the two associated electromagnetic actuating mechanisms. Fig. 7 is a sectional view on the line 7—7 of Fig. 6. Fig. 8 is a fragmentary sectional view on the line 8—8 of Fig. 6. Fig. 9 is a front elevation of the register shown in Fig. 6. Fig. 10 is an elevation of a plug showing the method of numbering the same. Fig. 11 is an end elevation of the plug shown in Fig. 10.

I will first describe the detailed construction of the various novel mechanisms which I use in my invention, and will then pass to a description of the operation of the system as a whole.

As shown in Figs. 2 and 3, an electromagnet 1 is mounted within the frame 2, and is provided with a core 3, the end of which acts as a pole to attract the armature 4 when the electromagnet 1 is energized. The armature 4 is pivotally mounted at 5. A spring 6 is attached on one end to the bracket 7 mounted on the framework 2, and on the other end to the armature 4, thus serving to keep the armature in the position shown in Figs. 2 and 3, further movement of the armature being prevented by means of the detent 6$^a$. Pivotally mounted near the free end of the armature 4 is the link 8, provided on its end with the shoulder 9, which is adapted to engage the teeth of the ratchet 10 rigidly attached to the gear 11 loosely mounted on the shaft 12. The shaft 12 is mounted on one end in the bracket 7, and on the other end within one of the walls 13 which are connected with the main framework 2. A gravity pawl 14 engages the ratchet 10 and serves to prevent backward movement of this ratchet and its associated gear 11.

As most clearly shown in Fig. 4, a lever 15 is pivotally mounted on the wall 13 at the point 16. Attached to this lever is the extension spring 17, the other end of which is suitably attached to a bracket 18 projecting from the wall 13, thus serving to normally throw the lever to the left, as shown in Fig. 4. A similar lever 19 is pivotally attached to the bracket 7 at the point 20, and the two levers 15 and 19 are rigidly connected by the bar 21, the object of which will be explained hereafter.

A removable register 22 is provided on each side with a pin 23, which is adapted to engage the slot 24 in each of the walls 13, 13.

Extending between the walls 13, 13 is the cross member 25 which is engaged by the portion 26 of the register 22 when this register is placed in position.

A spring 27 attached at one end to the frame 2 by means of screws 28, is provided at its other end with the V-shaped bent portion 29, which engages the portion 26 of the register 22 and serves to hold the register in position. When the end 29 of the spring 27 is depressed it is clear that the register 22 may be swung outwardly on the pins 23 as pivots, and then readily disengaged from the slots 24, and so entirely removed from the mechanism.

Mounted on the shaft 30 extending from the wall 13 to the bracket 7, are the carry-over wheels 31, 32 and 33, which engage the gears associated with the numeral wheels *a*, *b*, *c* and *d*, according to the well-known system. Collars 34 are provided between the numeral wheels in order to cause the same to retain their correct positions.

When the register 22 is placed in position, the gears associated with the numeral wheels *a*, *b*, *c* and *d* engage the carry-over wheels 31, 32 and 33, but when the register is removed the carry-over wheels still remain in the framework. The register 22 is provided with a projection 35 which engages the lever 15 and moves it to the position shown in Fig. 4. When the register is removed, however, the spring 17 becomes effective, and the connecting bar 21 engages the three carry-over wheels 31, 32 and 33, and thus prevents them from rotating. On account of this engagement, the gears of the register 22 will immediately come into mesh with the carry-over wheels when the register is placed in position.

Rigidly mounted on the shaft 36 of the register 22 is a dummy numeral wheel *e*, the numeral on this wheel which is exposed to view being 0. In order to normally cover this numeral on the dummy numeral wheel *e*, a shutter 37, pivotally mounted at 38, is provided. This shutter may be moved from its normal position, shown in Fig. 2, to its alternate position, shown in dotted lines, by means of the handle 39. The portion 40 of the shutter 37 acts as a switch blade, and is adapted to form connection, either with the contact 41 or 41ª mounted on the frame 2, according to the position in which the shutter 37 is placed. The cross member 25 is provided with two holes or sockets 42 and 43, which are placed in separate rows of arbitrarily assumed positions in this cross member. Each of these rows, as indicated in dotted lines, has ten arbitrary positions, in one of which each hole is placed.

Two pins 44 are provided on the portion 26 of the register 22, and are placed in such positions that they engage the holes 42 and 43 in the cross member 25.

Each individual workman has the pins of his register placed in a certain predetermined position, and by means of the device which we have just described it is impossible that his register should be engaged in the space which is assigned to any other workman, inasmuch as the holes 42 and 43 in this space correspond in position to the position of the pins in his register, and do not correspond to the position of the pins in any other register. If desired, the number of rows may be increased so that the number of possible combinations is correspondingly increased, it being a simple matter to obtain a thousand or ten thousand different possible combinations.

The operation of the above-described register and its actuating mechanism may now be readily understood. When the electromagnet 1 is energized, the armature 4 is attracted, and the shoulder 9 of the link 8 engaging a tooth of the ratchet 10, this ratchet is advanced one space, correspondingly advancing the gear 11 and the gear 45 rigidly attached to the numeral wheel *a*, and with which the gear 11 is in mesh. When the electromagnet 1 is deënergized, the spring 6 becomes effective in returning the armature 4 to its normal position against the detent 6ª, and the link 8 is moved to engage the next tooth of the ratchet 10, this ratchet being held from movement in a backward direction by means of the retaining pawl 14. When the shutter is in its normal position, as shown in Fig. 2, it will be evident that the indications of the numeral wheels *a*, *b*, *c* and *d* may be seen. For instance, the indication might be 1247. On the other hand, when the shutter is moved to the position shown in dotted lines in Fig. 2, the order of each numeral wheel will be raised by one, the original units numeral wheel *a* becoming the tens numeral wheel, the tens *b* becoming the hundreds wheel, etc., and the reading, instead of being 1247, will be 12,470. Thus when the shutter 37 is in its alternate position shown in dotted lines, a single actuation of the register has the same value as ten actuations when the shutter is in its normal position shown in full lines.

I will next describe the form of register and actuating mechanisms therefor which are used in connection with totalizing and job registers, as illustrated in Figs. 6 to 9 inclusive. Mounted within the frame 46 are the electro-magnets 47 and 48, which are provided with the cores 49 and 50. A partition 51 is attached to the framework 46 and separates the electromagnets from each other. Associated with the electromagnet 47 is the armature 52, which is normally held in the position shown in Figs. 6 and 8 against the detent 53 by means of the spring 54. The armature 55 associated with the electromagnet 48 is similarly held in its normal position against the detent 56 by means of spring 57. Pivotally attached to the armature 52 is the link 58 which engages, at its free end, the ratchet 59 rigidly connected to the gear 60 which is mounted on shaft 61. Similarly, the link 62 engages the ratchet 63 rigidly attached to gear 64 mounted on shaft 65. Extending between the walls 66, 66, attached to the main framework 46, is the cross member 67.

The register 68 is provided on its sides with the pins 69, which engage slots 70 in the walls 66, and with a portion 71 which engages the cross member 67, the spring 72 provided with the suitably bent end 73, serving to hold the register 68 in position. The register 68 is provided with numeral wheels $a'$, $b'$, $c'$, $d'$ and $e'$. Rigidly connected with numeral wheel $a'$ is the gear 74, which is in mesh with gear 64. Rigidly connected with numeral wheel $b'$ is the gear 75, in mesh with gear 60. The carry-over wheel 76 engages the gear 77, of the usual type, on the side of numeral wheel $a'$, and the gear 78 which is loosely mounted on the register shaft 79. The gear 75, as shown in Fig. 8, is rigidly mounted on the side of numeral wheel $b'$ by means of screws or other similar fastening devices 80. The gear 75 is cut away in its central portion, and in the space thus formed the ratchet 81 is rigidly mounted on the side of the numeral wheel $b'$. Pivotally mounted on the gear 78 is the retaining pawl 82 controlled by the spring 83. It is thus evident that the gear 75 and the numeral wheel $b'$ attached thereto may be moved in a contra-clockwise direction independently of the gear 78. On the other hand, when the gear 78 is actuated, the pawl 82 engaging the ratchet 81 causes the numeral wheel $b'$ to be rotated in a contra-clockwise direction, and the associated gear 60 is rotated in a clockwise direction, the link 58 riding over the teeth of the ratchet 59.

When the electromagnet 48 is energized, the armature 55 is attracted, and the gear 64 is rotated in a clockwise direction, thereby causing the associated gear 74 to rotate in a contra-clockwise direction. As the units numeral wheel $a'$ continues to be rotated, the tens, hundreds, thousands and ten thousands numeral wheels $b'$, $c'$, $d'$ and $e'$ respectively are rotated in the well-known manner to give the total actuations of the register. When the electromagnet 47 is energized, the armature 52 is attracted and the gear 60 is rotated one step in a clockwise direction, rotating the tens numeral wheel $b'$ one step in a contra-clockwise direction. It will therefore be apparent that a single energization of the electromagnet 47 is equivalent to ten energizations of the electromagnet 48. The carry-over wheels associated with the register 68 are mounted in the casing of this register, and, as explained above, when the register is removed, the carry-over wheels are removed with it, and when the register is placed in position, the gears 74 and 75 are brought into mesh with the gears 64 and 60 respectively.

As shown in Fig. 9, in the front of the register 68 a groove 84 is provided, in which the slide 85 is adapted to be placed. On this slide is placed the number of the register. The slide 85, after being inserted in the groove 84, is held in position by the screw 86, which engages the hole 87. A similar device may be used on the wage registers above described, if so desired. By removing the slide 85, the number of the register may readily be changed. In connection with the portion 71 of the register 68, pins may be used, as described in connection with the wage register, which may fit into corresponding holes in the cross member 67.

Having thus described the detailed construction of the registers and their actuating mechanism, used in connection with my system, I will now pass to a general description of the system as a whole, as shown in Fig. 1. Mounted on the shaft 88 is the wage brush WB which dips in the mercury trough MT. Also mounted on shaft 88 is the worm gear 89 in mesh with gear 90 mounted on the shaft 91. The speed of rotation of the shaft 88 which is suitably driven by a motor or main line shaft is such that the shaft 91 is rotated preferably at a speed of one revolution in two minutes. The gear 90 has twenty-four teeth, so that twenty-four revolutions of the shaft 88 are necessary in order to make one revolution of the shaft 91. That is, the speed of shaft 88 will be twelve revolutions per minute, and the wage brush WB will dip in the mercury trough MT twelve times per minute, or 720 time per hour. Also rigidly mounted on shaft 91 are the disks 92 and 93, which have a number of teeth on their peripheries corresponding to the number of actuations which it is desired to communicate to the mechanism connected with and driven by these disks. It will be noted that the teeth of the disk 93 are in a position corresponding to the blank periphery of the disk 92, and vice versa. According to this system, the number of disks mounted on the shaft 91 could be increased indefinitely.

Mounted on the shaft 94 is the gear 95, the teeth of which are adapted to engage the teeth of the disk 92. It will be noted that, in the gear ratios shown, one revolution of the disk 92 will rotate the gear 95 two revolutions. Similarly, the gear 96 mounted on shaft 97 has teeth adapted to engage the teeth of the disk 93, and when the disk 93 is rotated once the gear 96 will also be rotated through one revolution. In this way it is clear that a single revolution of the shaft 91 will cause the shaft 94 to be rotated through two revolutions, and the shaft 97 to be rotated through one revolution.

Shaft 98 is suitably connected by bevel gears with shaft 94, and is in turn connected by bevel gears with shaft 99 of the rate switch RS. The detailed construction of this rate switch RS has been described in my copending application Serial No. 495,717, so that it is unnecessary to again describe it in this connection, inasmuch as it forms no part of the novelty of the present invention. Mounted on the shaft 98, and insulated from the connecting mechanism by the insulating section 100, are the brushes 101 and 102, which are adapted to make contact with the selector commutators SC¹ and SC². These selector commutators are divided into a number of conducting and non-conducting segments, the number of conducting segments shown in Fig. 1 being 8.

The shaft 103 is connected by suitable bevel gearing with shaft 97. Mounted on shaft 103, but insulated from the connecting parts by the insulating section 104 are the brushes 105 and 106, which form connection with the selector commutators SC³ and SC⁴.

Connected with shaft 88 is the conductor 107 leading to the rate switch RS. Associated with the rate switch is the rate jack board RJ having the jacks J⁵ to J⁶⁰, the series of jacks J⁵ representing a rate of wages of five cents per hour, as will be explained hereafter, and the series of jacks J⁶⁰ representing sixty cents per hour. Each workman is assigned a rate plug, as RP¹, which is adapted to be inserted in any of the jacks of the rate jack board RJ, according to the rate of wages which the workman is to be paid. The rate plug RP¹ is connected by the conductor 108 with one of the conducting segments of the selector commutator SC¹. Attached to the corresponding conducting segment of the selector commutator SC² is the conductor 109, which leads to the switch S¹ assigned to the same workman. Conductor 110 leads from the switch S¹ to the actuating mechanism of the wage register W¹. Similarly, the rate plugs of workmen 2 to 5 are connected with appropriate conducting segments of the selector commutator 1, and conductors 109 lead from corresponding segments of the selector commutator SC² to the switches S² . . . S⁵. The switches S² . . . S⁵ are also connected with wage registers W² . . . W⁵ by means of conductors 110.

Rate plugs RP⁶ . . . RP¹⁰, on the other hand, are connected by conductors 111 with appropriate conducting segments of the selector commutator SC³. Conductors 112 lead from corresponding conducting segments of the selector commutator SC⁴ to the switches S⁶ . . . S¹⁰.

It will be noted that rate plugs RPᵃ and RPᵇ are connected through their respective conductors 111ᵃ with conducting segments of the selector commutators SC¹ and SC³ respectively, whereas the corresponding conducting segments of the selector commutators SC² and SC⁴ are connected through suitable conductors 113 and 114 with the so-called "addition" plugs Aᵃ and Aᵇ respectively. The addition jacks JA and JB are provided in series with each of the conductors 109 and 112 respectively. The object of these addition jacks will be explained hereafter.

In connection with each wage register W¹ . . . W⁶ is provided the shutter 37, as explained above. This shutter may be in its normal position covering the dummy units numeral wheel, as shown in connection with the registers W¹, W², W³, W⁸, W⁹, and W¹⁰, or may be moved to its alternate position exposing the dummy numeral wheel to view, as shown in registers W⁴, W⁵, W⁶, and W⁷. Associated with each shutter 37 are the two contacts 41 and 41ᵃ. When the shutter is in its normal position the conductor 110, after affording connection with the windings of the electromagnet 1 of the wage register, passes to the shutter 37, the portion 40 of the shutter thereby affording electrical connection between the conductor 110 and the contact 41. Leading from the contact 41 are the conductors 115, each of these conductors 115 leading to the sleeve contacts of the job plugs JP¹ . . . JP¹⁰. On the other hand, when the shutter 37 is in its alternate position, the portion 40 of the shutter affords electrical connection between the conductor 110 and the contact 41ᵃ. The conductors 116 lead from each contact 41ᵃ to the tip contacts of the job plugs JP¹ . . . JP¹⁰.

I provide a series of job jacks JJᵃ . . . JJʲ, each series of jacks being associated with job registers Jᵃ . . . Jʲ. A conductor 117 leads from the tip contacts of each series of jacks to the electromagnet 48 associated with each of the job registers Jᵃ . . . Jʲ. On the other hand, a conductor 118 leads from the sleeve contacts of each series of jacks to the electromagnet 47 associated with each of the registers Jᵃ . . . Jʲ. Conductor 119 leads from the electromagnet 48 of the job register Jᵃ, and each of the electromagnets 48 of registers Jᵇ . . . Jʲ are connected in multiple to this conductor 119.

When any one of the plugs JP¹ . . . JP¹⁰ is not inserted in one of the jacks of the series JJᵃ . . . JJʲ, the plug is inserted in one of the waste-wage jacks WJ¹ . . . WJ¹⁰, one of these jacks being assigned to each of the ten workmen whose job plugs are represented as JP¹ . . . JP¹⁰. As in the case of the job jacks JJᵃ . . . JJʲ, each of the waste-wage jacks WJ¹ . . . WJ¹⁰ has a tip and sleeve contact. When the shutter of the corresponding wage register forms connection with the contact 41, electrical connection is established between the conductor 110 and the conductor 115 leading to the sleeve of one of the plugs JP¹ . . . JP¹⁰. When the plug, as JP¹, is inserted in its jack WJ¹, electrical connection will thereby be established between conductor 110 and the sleeve contact of the jack. The sleeve contacts of all of the jacks WJ¹ . . . WJ¹⁰ are connected in multiple with the conductor 120 which leads to the electromagnet 47 of the waste-wage register WW. Similarly, when the shutter forms connection with the contact 41ᵃ associated with any wage register, the corresponding job plug forms an electrical connection with the tip contact of the waste-wage jack in which it may be inserted. All of the tip contacts of the waste-wage jacks are connected in multiple by the conductor 121 which leads to the electromagnet 48 associated with the waste-wage register WW. Conductor 122 leads from the electromagnet 48 of the waste-wage register WW to the conductor 119.

Conductor 123 leads from the electromagnet 47 of the job register $J^a$, and the electromagnets 47 of all of the other job registers $J^b \ldots J^j$ are connected in multiple to this conductor 123. Conductor 124, leading from electromagnet 47 of the waste-wage register WW, is also connected to the conductor 123.

I have mentioned the waste-wage jacks $WJ^1 \ldots WJ^{10}$ as being adapted to receive the job plugs $JP^1 \ldots JP^{10}$ in a manner similar to that in which the job jacks $JJ^a \ldots JJ^j$ receive these plugs. It is a simple matter, however, to arrange the waste-wage jacks so that the contacts are formed when the job plugs $JP^1 \ldots JP^{10}$ are in their plug seats, so that it is unnecessary to make any special insertions of the plugs in jacks, but when the plug is withdrawn from its job jack it automatically forms contact with the circuit controlling the waste-wage register when it is allowed to drop back into its plug seat.

The conductor 119 leads to the electromagnet 48 of the total wage register WT, and the conductor 123 leads to the electromagnet 47 of the same register. Conductors 125 and 126 leading from the electromagnets 48 and 47 respectively, are joined to the conductor 127 which leads to the electric main 128. The conductor 129 leads from the main 130 to the mercury in the mercury trough MT.

The operation of my system may now be clearly understood. When a workman, for example, workman 1, starts work, he first closes the switch $S^1$, and if his rate plug $RP^1$ is not already inserted in one of the jacks $J^5 \ldots J^{60}$, he inserts it in the proper jack, which, if he received five cents per hour, would be $J^5$. In order to understand clearly the operation of the various parts we will next trace the electric circuit which controls the various registers which will now be actuated.

The current starts from the main 130 and passes through the conductor 129 to the mercury in the mercury trough MT. The wage brush WB dips in the mercury trough, as explained above, at the rate of 720 times per hour. When the brush is in the mercury, current will pass along the shaft 88 to the conductor 107, and thence to the rate switch RS. The rate switch is so constructed that it allows the flow of electric impulses generated by the brush WB, only for a number of times proportional to the rate of wages which the workman is to receive. When contact is made through the rate switch RS the current flows through rate plug $RP^1$, and then through conductor 108 to a conducting segment of the selector commutator $SC^1$.

According to the mechanism which has already been described, the brush 101 successively forms contact with the various conducting segments of this selector commutator. According to the gear relations which are shown in Fig. 1 and the speed of rotation of the shafts 88 and 91 which we have assumed, the brush 101 will make contact with each of the eight conducting segments once each minute. Each impulse which actuates a wage register is, for purposes of convenience, assumed to represent one cent, so that it will now be clear that to receive five cents per hour, workman 1 must have the circuit closed only one-twelfth of the sixty times per hour which the brush makes contact with his conducting segment of the selector commutator $SC^1$. As mentioned above, this result is obtained by means of the rate switch RS. From the conducting segment of the selector commutator $SC^1$ the current passes through brush 101 and shaft 98 to the brush of selector commutator $SC^2$, then through the corresponding conducting segment of this commutator, and through conductor 109 to the switch $S^1$. This switch being closed, the current passes through conductor 110 to the actuating mechanism of the wage register $W^1$. The shutter 37 being placed in the position shown, the current passes through the portion 40 of the shutter, then through conductor 115 to the sleeve contact of the job plug $JP^1$. If this job plug is inserted in the jack $WJ^1$ the current passes through conductor 120 to the electromagnet 47 which actuates the waste-wage register WW. The current then passes through conductors 124 and 123 to the electromagnet 47 of the total wage register WT, and then through conductors 126 and 127 to the main 128, thus completing the circuit.

If the job plug $JP^1$ is inserted in any of the series of jacks $JJ^a \ldots JJ^j$, as, for example, $JJ^a$, the current passes through conductor 118 to the electromagnet 47 of the job register $J^a$, then through conductor 123 to the electromagnet 47 of the total wage register WT, and then through the conductors 126 and 127 to the main 128, thus completing the circuit through a second path.

If instead of being paid five cents per hour, workman 1 were to be paid fifty cents per hour, the shutter 37 would be moved to its alternate position, the portion 40 of this shutter making connection with the contact 41ª. The current would then pass from the electromagnet of the wage register W¹ through the conductor 116 to the tip contact of the job plug JP¹. If this plug is inserted in jack WJ¹, the current will pass through conductor 121 to the electromagnet 48 of the waste-wage register WW, then through conductor 122 to conductor 119, and to the electromagnet 48 of the total wage register WT, thence through the conductors 125 and 127 to the main 128, thus completing the circuit through a third path. If the job plug JP¹ is inserted in one of the jacks JJª, the current will pass through conductor 117 to the electromagnet 48 of the job register Jª, thence through conductor 119 to the electromagnet 48 of the total wage register WT, and thence through conductors 125 and 127 to the main 128, thus completing the circuit through a fourth path.

Let us now take the case of workman 6. His plug RP⁶ is inserted in any of the jacks J⁵ ... J⁶⁰, for example, J¹⁰, and his switch S⁶ is closed. The plug RP⁶ is connected through conductor 111 with a conducting segment of the selector commutator SC³. Now, according to the gear ratios which are shown, the brush 105 makes contact with the conducting segments of selector commutator SC³ only half the number of times which the brush 101 makes contact with the conducting segments of the selector commutator SC¹, or thirty times per hour. The rate switch RS allows the number of impulses flowing to the series of jacks J¹⁰ to be one-sixth of the number if the circuit through the rate switch were continuously closed. The number of impulses passing to any one conducting segment of the selector commutator SC³ would therefore be one-sixth of thirty, or five, and workman 6 would therefore be paid the same wages as workman 1 in the case which we assumed above. From the conducting segment of the selector commutator SC³ the current may be traced through shaft 103 to the selector commutator SC⁴, and thence through the actuating mechanisms of the wage and job registers in exactly the same manner as described in connection with the circuit of workman 1.

Now let us assume that workman 1 is to be paid sixty-five cents per hour. The rate plug RP¹ might then be inserted in the jack J⁶⁰, and one of the rate plugs RPª should then be inserted in the jack J⁵ and the corresponding addition plug Aª would be inserted in one of the addition jacks JA associated with conductor 109 of workman 1's circuit. In this way the impulses flowing through conductor 109 would equal the number flowing directly through the conducting segment of selector commutator 2 assigned to workman 1, or sixty impulses, plus the number of impulses flowing through the conducting segment associated with the addition plug Aª, or five, giving sixty-five as the total number of impulses, and workman 1 would therefore be paid sixty-five cents per hour. If it were desired to pay him seventy-five cents per hour, this result could be accomplished by inserting a second plug RPª in a jack J¹⁰, and a corresponding second addition plug Aª in a second jack JA associated with conductor 109. It will be evident from this description that great flexibility is possible in assigning the rates of wages to the various workmen.

It is often desirable that the various plugs assigned to different workmen should be clearly distinguishable to prevent confusion in the use of the plugs. For this reason I often find it of advantage to place the number of the workman on each plug in the manner shown in Figs. 10 and 11, the numbers being placed both on the portion 131 and the portion 132 of the shoulder member 133 of each plug, and in this way the numbers are always visible in whatever position the plug may be placed.

It is evident that many changes could be made in the detailed construction of the system and mechanisms which I have described, without departing from the spirit of my invention.

What I claim is:

1. In an accounting system, the combination of a first indicating register, an actuating mechanism for said register, means for selectively varying the numerical value of the actuations of said register, a second register, a plurality of actuating mechanisms for said second register, and means for connecting the actuating mechanism of the first register with one of the actuating mechanisms of the second register so that the numerical value of the actuations of said registers will be the same.

2. In an accounting system, the combination of a first indicating register, an actuating mechanism for said register, means for selectively changing the value of the actuations of said register, a second indicating register, a plurality of actuating mechanisms associated with said register, and means for selectively connecting the actuating mechanism of the first register with one of the actuating mechanisms of the second register so that the actuations of said registers will have the same numerical value.

3. In an accounting system, the combination of a wage register, an actuating mechanism for said register, means for selectively varying the numerical value of the indications of said register, a job register, a plurality of actuating mechanisms for said job register, and means for connecting the actuating mechanism of the wage register with one of the actuating mechanisms of the job register so that the actuations of said registers will have the same numerical value.

4. In an accounting system, the combination of a plurality of indicating registers, an actuating mechanism for each of said registers, means for selectively varying the numerical value of the actuations of each of said registers, a totalizing register, a plurality of actuating mechanisms adapted to be operatively connected with said totalizing register, and means for selectively connecting the actuating mechanism of each indicating register with one of the actuating mechanisms of said totalizing register, so that the actuations of the totalizing register will have the same numerical value as the sum of the actuations of the individual indicating registers.

5. In an accounting system, the combination of a source of electric current, an indicating register, an electromagnetic actuating mechanism for said register, means for selectively varying the numerical value of the actuations of said register, a second register, a plurality of electromagnetic actuating mechanisms for said second register, and means for selectively connecting the actuating mechanism of the first register with one of the actuating mechanisms of the second register so that the actuations of said registers will have the same numerical value.

6. In an accounting system, the combination of a source of electric current, a wage register, an electromagnetic actuating mechanism for said register, means for selectively varying the numerical value of the actuations of said register, a job register, a plurality of electromagnetic actuating mechanisms for said job register, and means for selectively connecting the actuating mechanism of said wage register with one of the actuating mechanisms of said job register so that the actuations of said registers will have the same numerical value.

7. In an accounting system, the combination of a source of electric current, a plurality of wage registers, an electromagnetic actuating mechanism for each of said registers, means for selectively changing the numerical value of the actuations of each of said registers, a plurality of job registers, a plurality of electromagnetic actuating mechanisms for each of said registers, a totalizing register, a plurality of electromagnetic actuating mechanisms for said totalizing register, the actuating mechanisms of each job and the totalizing register adapted to actuate numeral wheels of different orders, and means for selectively connecting the actuating mechanism of each of said wage registers with one of the actuating mechanisms of a job register and one of the actuating mechanisms of the totalizing register so that the actuations of said wage, job and totalizing registers will have the same numerical value.

8. In an accounting system, a plurality of electromagnetic actuating mechanisms, a removable indicating register adapted to be brought into operative connection with a corresponding actuating mechanism, means for retaining the register in said connection, and means for preventing the register from being brought into operative connection with the other actuating mechanisms.

9. In an accounting system, an electromagnetic actuating mechanism having a supporting frame, an engaging member on said frame, a removable indicating register having an engaging portion adapted to fit the engaging member of said frame, and means for retaining said register in its engaging position.

10. In an accounting system, the combination of a plurality of electromagnetic actuating mechanisms, each mechanism having an engaging member of a predetermined form, a plurality of removable indicating registers, each register having a portion of predetermined form adapted to engage only with an actuating mechanism having an engaging member of a corresponding form, and means for retaining said register in operative connection with said actuating mechanism.

11. In an accounting system, the combination of a plurality of actuating mechanisms, each mechanism having an engaging member with a hole in a predetermined position, a removable indicating register with an engaging portion having a pin projecting therefrom in a predetermined position corresponding to the position of the hole in the engaging member of the frame of the actuating mechanism with which engagement is to be made, said pin thereby preventing engagement of the register with an actuating mechanism not having a hole in the position corresponding to the position of said pin on the register, and means for retaining said register in operative connection with said actuating mechanism.

12. In an accounting system, the combination of a source of electric impulses, a plurality of indicating registers, an electromagnetic actuating mechanism for each of said registers, means for successively connecting the actuating mechanisms of said registers with said source of impulses, means for selectively varying the number of impulses passing to the actuating mechanism of each register at each of said connections, and auxiliary connecting means associated with the successive connecting means for affording additional connection between the actuating mechanism of any of said registers and said source, for a predetermined number of impulses.

13. In an accounting system, the combination of a source of electric impulses, a plurality of wage registers, an electromagnetic actuating mechanism for each of said registers, a selector mechanism for successively connecting the actuating mechanisms of said wage registers with the source of impulses, a rate switch for selectively varying the number of impulses flowing to each register during its connection with the selector mechanism, and auxiliary connecting means associated with said selector mechanism for allowing the flow of an additional predetermined number of impulses to the actuating mechanism of any of said wage registers.

14. In an accounting system, the combination of a source of electric impulses, a plurality of wage registers, an electromagnetic actuating mechanism for each of said registers, a selector mechanism comprising a plurality of conducting segments and a rotating brush for successively connecting each of said segments with said source of impulses, means connecting the actuating mechanism of each of said wage registers with a corresponding segment of the selector mechanism, a rate switch for controlling the number of impulses flowing to each of said conducting segments of said selector mechanism, and auxiliary means for connecting the actuating mechanism of any of said registers with an additional conducting segment, thereby allowing the flow of additional impulses to said register.

15. In an accounting system, a source of electric impulses, a plurality of wage registers, an electromagnetic actuating mechanism for each of said registers, a plurality of selector mechanisms each having a plurality of conducting segments, means connecting the actuating mechanism of each of said registers with a conducting segment of one of said selector mechanisms, a rate switch electrically connected with the source of impulses to allow the flow of a plurality of predetermined numbers of impulses, means for successively connecting each of the conducting segments of the selector mechanisms with the rate switch to allow the passage of a predetermined number of impulses during said connection, and means for causing each selector mechanism to make a predetermined number of connections with said rate switch during a predetermined length of time.

16. In an accounting system, a source of electric impulses, a plurality of wage registers, an electromagnetic actuating mechanism for each of said registers, a plurality of selector mechanisms each having a plurality of conducting segments, means connecting the actuating mechanism of each of said registers with a conducting segment of one of said selector mechanisms, a rate switch electrically connected with the source of impulses to allow the flow of a plurality of predetermined numbers of impulses, means for successively connecting each of the conducting segments of the selector mechanisms with the rate switch to allow the passage of a predetermined number of impulses during said connection, and means for successively causing the selector mechanisms to make a predetermined number of connections with the rate switch during a predetermined length of time.

17. In an accounting system, a source of electric current, a plurality of wage registers, a plurality of job registers, an electromagnetic actuating mechanism for each of said registers, and a plurality of plugs for establishing connection between the actuating mechanisms of said registers and the source of current, each of said plugs having identifying characters thereon.

18. In an accounting system, the combination of a supporting frame having register receptacles, electromagnetic actuating devices associated with each receptacle, and registers having devices for engaging said actuating devices, said registers being interchangeable in said receptacles.

19. In an accounting system, the combination of a supporting frame having register receptacles, electromagnetic actuating devices associated with the receptacles, registers having devices for engaging said actuating devices, said registers being interchangeable in said receptacles, and means for retaining the devices in engagement.

20. In an accounting system, a source of electric impulses, two sets of registers, and switching mechanism for connecting each of the registers of one set in condition for actuation a different number of times per unit of time from the number of times each of the registers of the other set is similarly connected by said switching mechanism.

21. In an accounting system, the combination of two sets of registers, time-controlled mechanism, and devices for establishing an operative condition of each of the registers of one set a certain number of times for each unit of time different from the number of times that each register of the other set is similarly connected by said devices in the same unit of time.

22. In an accounting system, the combination of a plurality of registers, time-controlled mechanism, and devices for connecting a desired one of said registers with said time-controlled mechanism for actuation directly into either of two orders of value of said register.

23. In an accounting system, the combination of a plurality of registers, time-controlled mechanism, and devices for connecting a desired one of said registers with said time-controlled mechanism for actuation at a rate representing either one of two orders of value of said register.

24. In an accounting mechanism, the combination of a plurality of registers, time-controlled mechanism, devices for connecting a desired one of said registers with said time controlled mechanism for actuation at a rate representing either one of two orders of value of said register, and mechanism for indicating the value of operation of the selected register depending upon the operating value of the connection established.

25. In an accounting system, the combination of a supporting frame having register receptacles, carry-over gears mounted in said receptacles for engaging detachable registers, actuating devices associated with the receptacles, and registers having devices for engaging said actuating devices and at the same time engaging said carry-over gears, said registers being interchangeable in said receptacles.

26. In an accounting system, the combination of a supporting frame having register receptacles, carry-over gears mounted in said receptacles for engaging detachable registers, electromagnetic actuating devices associated with the receptacles, and registers having devices for engaging said electromagnetic actuating devices and at the same time engaging said carry-over gears, said registers being interchangeable in said receptacles.

27. In an accounting system, the combination of a supporting frame having register receptacles, actuating devices associated with the receptacles for operating registers in either of two orders of value, registers having devices for engaging said actuating devices, and indicating devices for indicating upon the registers the value of the order of actuation, said registers being interchangeable in said receptacles.

28. In an accounting system, the combination of a supporting frame having register receptacles, electromagnetic actuating devices associated with the receptacles for operating registers in either of two orders of value, registers having devices for engaging said electromagnetic actuating devices, and indicating devices for indicating upon the registers the value of the order of actuation, said registers being interchangeable in said receptacles.

In witness whereof, I hereunto subscribe my name this 31st day of December, A. D. 1909.

FREDERICK O. HEUSER.

Witnesses:
HENRY M. HUXLEY,
J. S. ABBOTT.

Copies of this patent may be obtained for five cents each, by addressing the "Commissioner of Patents, Washington, D. C."